United States Patent
Uchida (10) Patent No.: US 9,511,512 B2
(45) Date of Patent: Dec. 6, 2016

(54) MIXING APPARATUS AND SEALANT

(75) Inventor: Toyokazu Uchida, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1165 days.

(21) Appl. No.: 13/125,353

(22) PCT Filed: Nov. 30, 2009

(86) PCT No.: PCT/JP2009/006459
§ 371 (c)(1),
(2), (4) Date: Apr. 21, 2011

(87) PCT Pub. No.: WO2010/097873
PCT Pub. Date: Sep. 2, 2010

(65) Prior Publication Data
US 2011/0200767 A1    Aug. 18, 2011

(30) Foreign Application Priority Data

Feb. 27, 2009    (JP) ................................ 2009-046694

(51) Int. Cl.
   *B29B 7/00*        (2006.01)
   *B01F 5/06*        (2006.01)
       (Continued)

(52) U.S. Cl.
CPC ............. *B29B 7/325* (2013.01); *B01F 13/103* (2013.01); *B29B 7/402* (2013.01); *B29B 7/7461* (2013.01); *B29B 7/847* (2013.01); *B29C 47/364* (2013.01); *B29C 47/54* (2013.01); *Y10T 428/13* (2015.01)

(58) Field of Classification Search
CPC ...... B01F 5/0682; B29B 7/402; B29B 7/325

USPC ....... 366/132, 133, 134, 136, 144, 145, 149, 366/147, 163.1, 182.3, 182.4, 336, 91
See application file for complete search history.

(56) References Cited

U.S. PATENT DOCUMENTS 3,873,072 A * 3/1975 Blackmon ........................ 366/80
4,538,917 A * 9/1985 Harms ............................. 366/75
(Continued)

FOREIGN PATENT DOCUMENTS

EP      0 952 173      10/1999
JP      55-111831      8/1980
(Continued)

OTHER PUBLICATIONS

International Search Report issued Mar. 16, 2010 in International (PCT) Application No. PCT/JP2009/006459.
(Continued)

*Primary Examiner* — Tony G Soohoo
*Assistant Examiner* — Anshu Bhatia
(74) *Attorney, Agent, or Firm* — Wenderoth, Lind & Ponack, L.L.P.

(57) ABSTRACT

A mixing apparatus includes a main agent supply unit that supplies a main agent to a main agent pipe and a curing agent supply unit that supplies a curing agent to a curing agent pipe. A mixing pipe, with which the main agent pipe and the curing agent pipe merge and through which the main and curing agents pass, has a static mixer and a dynamic mixer that sequentially mix the main and curing agents. A discharge pipe discharges a sealant obtained through the static mixer and the dynamic mixer. An in-system decompressor sets at least the static mixer and the dynamic mixer in a decompressed atmosphere before the main and curing agents are mixed.

10 Claims, 2 Drawing Sheets

(51) Int. Cl.
  *B29B 7/32* (2006.01)
  *B29B 7/40* (2006.01)
  *B29B 7/74* (2006.01)
  *B29B 7/84* (2006.01)
  *B01F 13/10* (2006.01)
  *B29C 47/36* (2006.01)
  *B29C 47/54* (2006.01)

(56) References Cited

U.S. PATENT DOCUMENTS

| | | | |
|---|---|---|---|
| 4,846,373 A * | 7/1989 | Penn et al. | 222/137 |
| 5,149,720 A | 9/1992 | DesMarais et al. | |
| 5,174,651 A | 12/1992 | Gaddis | |
| 5,281,379 A * | 1/1994 | Noguchi et al. | 264/102 |
| 5,823,669 A * | 10/1998 | Jones | 366/132 |
| 6,281,278 B1 * | 8/2001 | Takase et al. | 524/497 |
| 2005/0161863 A1 | 7/2005 | Otto et al. | |
| 2007/0121421 A1 * | 5/2007 | Blach | 366/85 |
| 2007/0140051 A1 | 6/2007 | Perkins et al. | |
| 2009/0079106 A1 * | 3/2009 | Abiru | 264/216 |

FOREIGN PATENT DOCUMENTS

| | | |
|---|---|---|
| JP | 3-53914 | 3/1991 |
| JP | 10-156863 | 6/1998 |
| JP | 2002-211514 | 7/2002 |
| JP | 2002-321214 | 11/2002 |
| JP | 2005-279478 | 10/2005 |
| JP | 2007-15133 | 1/2007 |
| JP | 2007-136432 | 6/2007 |
| JP | 2008-264707 | 11/2008 |
| WO | 99/24495 | 5/1999 |
| WO | 2005/061581 | 7/2005 |

OTHER PUBLICATIONS

International Preliminary Report on Patentability and Written Opinion of the International Searching Authority issued Sep. 22, 2011 in International (PCT) Application No. PCT/JP2009/006459.
Japanese Notification of Reasons for Refusal issued Apr. 3, 2013 in corresponding Japanese Patent Application No. 2009-046694 with English translation.
Supplementary European Search Report issued Apr. 18, 2013 in corresponding European Patent Application No. 09840727.3.

* cited by examiner

MIXING APPARATUS AND SEALANT

TECHNICAL FIELD

The present invention relates to an apparatus that mixes two or more kinds of high viscosity materials, and, more particularly to a mixing apparatus suitable for mixing a main agent and a curing agent to obtain a sealant or an adhesive.

BACKGROUND ART

As a material for closing and sealing gaps of connecting sections and seams of various structures such as an airplane, a sealant is used and, as a material for joining the gaps, an adhesive is used. As the sealant and the adhesive, there are those of one-component type and those obtained by mixing two or more components of a main agent and a curing agent. When the two-component type sealant or adhesive is used, after the two components are mixed, sealing work or bonding work is performed. Taking workability into account, in some case, the two-component type sealant or adhesive is filled in a cartridge and jetted from the cartridge to a target place to perform the sealing work or the bonding work. An example in which the two-component sealant is filled in the cartridge and used to perform the sealing work is explained below.

An efficient method of filling a sealant obtained by mixing a main agent and a curing agent in a cartridge is disclosed in Patent Document 1. In this method, an upper cap of a can containing the sealant is removed to form an opening and the can opening is sealed by a can sealing lower cap having an openable and closable hole in the center. The can is vertically reversed to face the bottom upward, the can sealing lower cap is placed on a substrate, and the periphery of the can bottom is cut to remove the can bottom. Subsequently, the can bottom is horizontally inserted into the can and placed on the surface of the sealant on the inside. The can bottom opening is sealed by a can sealing upper cap having an air supply port. The air is supplied from the air supply port to press the can bottom inserted into the can and the sealant is extruded from the center hole of the can sealing lower cap and filled in the cartridge.

CITATION LIST

Patent Document

Patent Document 1: Japanese Patent Laid-Open No. 2002-211514

SUMMARY OF INVENTION

Problems to be Solved by the Invention

At an instance when a sealant filled in a cartridge is jetted from the cartridge, in some case, the sealant bursts. This is caused because, although the air caught in the sealant is subjected to pressure and compressed in the cartridge, the pressure is released and the caught air instantaneously expands when the sealant is jetted to the outside from nozzles of the cartridge. If the sealant bursts, work cannot be performed while predetermined work quality requirements are met, for example, the sealant cannot be applied at uniform film thickness to a target place. Therefore, it is necessary to apply sealing work to the same place again. Since the sealant scatters to unnecessary places, in some case, the sealant is wasted and the scattered sealant has to be removed.

Therefore, it is an object of the present invention to provide an apparatus suitable for mixing of a high viscosity material with which a sealant with the air caught therein reduced can be obtained.

Means to Solves the Problems

As explained above, the main agent and the curing agent are mixed, whereby the sealant is in a use state. However, when both the main agent and the curing agent are highly viscous, if the air is caught in the sealant in a process of mixing, the air does not easily escape because of the high viscosity. The burst during the sealing work is caused by the air caught in the mixing process. Therefore, it was examined to mix the main agent and the curing agent without catching the air. However, it was difficult to reduce an amount of the caught air simply by specifying a mixer. Therefore, in order to reduce an amount of the air caught in the entire mixing process, the inventors led, after setting an area where the main agent and the curing agent are mixed in a decompressed atmosphere in advance, the main agent and the curing agent to the area and started mixing. Then, when the sealant was jetted from the cartridge, the burst of the sealant was able to be eliminated. In particular, components of the sealant tend to be separated in a can when days elapse after the sealant is manufactured by a sealant material manufacturer, filled in the can or the like, and shipped. The sealant tends to catch the air when, before being mixed, the main agent and the curing agent are respectively agitated and mixed. A mixing apparatus for a high viscosity material according to the present invention (hereinafter simply referred to as mixing apparatus) is based on an examination result explained above.

The mixing apparatus according to the present invention mixes at least two kinds of raw materials and includes a first supply unit that supplies a first raw material to a first channel and a second supply unit that supplies a second raw material to a second channel and further includes a third channel with which the first channel and the second channel merge and through which the first raw material and the second raw material pass. A mixer that mixes the first raw material and the second raw material is provided on the third channel. A mixed material obtained through the mixer is discharged through a fourth channel. The mixing apparatus according to the present invention is characterized by including an in-system decompressor that sets at least the mixer in a decompressed atmosphere before the first raw material and the second raw material are mixed.

The mixing apparatus and a process according to the present invention preferably agitate the first raw material and the second raw material under reduced pressure beforehand. After the mixer is set in the decompressed atmosphere, if the first raw material and the second raw material are mixed, it is possible to reduce the air from being caught in the process of mixing. Therefore, even if the obtained mixed material, for example, a sealant is jetted from a cartridge, a burst is not caused. As a method of agitating each of the first raw material and the second raw material under reduced pressure beforehand, it is also possible that supply ports are respectively opened at the bottoms of containers for the first raw material and the second raw material and, after the first raw material and the second raw material are filled to the bottom from the supply ports, the first raw material and the second raw material are agitated by fluid convection or the first raw material and the second raw material are filled to the bottom with pipes reaching from an upper cap to near the bottoms of the containers. It is also possible that the first raw material and the second raw material in the material cans are agitated using agitation plates under reduced pressure beforehand and, thereafter, the respective containers are used as the material containers of the present invention. It is important to agitate the first raw material and the second raw material beforehand because of a mixing process.

The mixing apparatus according to the present invention preferably includes a cooling box for cooling the mixer at least while the mixer mixes the first raw material and the second raw material.

For example, under the room temperature, a cold setting sealant obtained by mixing a main agent and a curing agent starts to be cured after the mixing. Therefore, in the past, the sealant after the mixing is stored in a freezer to prevent the sealant from being cured and is defrosted to the room temperature before use. However, if the mixer is stored in the cooling box and, while the first raw material and the second raw material are mixed, kept at temperature that is lower than curing temperature and at which the mixer is not frozen and the viscosity of the sealant after the mixing is not extremely high, it is possible to suppress the sealant from being cured in the mixer. Then, in the case of discontinuous filling in which filling of the sealant in plural cartridges via the fourth channel is performed at time intervals, the sealant after the mixing, curing of which has not proceeded, can be filled in the cartridges. Therefore, the sealing work can be smoothly performed.

For example, in a certain sealant, a curing time is about 20 hours under an environment in which relative humidity is 60% and temperature is 40° C. The curing time changes to about 35 hours at 25° C. and about 110 hours at 10° C. It is possible to suppress a curing reaction by lowering temperature.

When the mixing apparatus includes the cooling box as explained above, the mixing apparatus according to the present invention preferably includes a air blowing means for blowing the dry air to a discharge port to which the mixed material is discharged and a valve that blocks the discharge port from the outside of the cooling box. As the valve, a valve that can be flexibly deformed to block an opening gap according to insertion of a cartridge for filling the sealant such as a rubber valve is preferable. It is preferable to prevent the wet air from coming into contact with the discharge port by discharging the dry air.

It is preferable that valves are provided in two stages with a space provided between the valves and the dry air is supplied to the space between the valves. This makes it possible to prevent occurrence of a large volume of due condensation water and frosting.

When the cooling box is provided, it is preferable to provide, in the cooling box, a storage container that temporarily stores the mixed material. The mixed material passing through the fourth channel is fed into the storage container.

In the process in which the discontinuous filling is performed, the excess sealant (mixed material) is collected in the storage container when the filling in the cartridge is not performed. If a sufficient amount of the sealant is accumulated in the storage container, the mixing by the mixer can be stopped and the filling of the sealant from the storage container to the cartridge can be performed. Since this storage container is provided in the cooling box, the proceeding of curing of the accumulated sealant is suppressed. Therefore, even if the mixer is not operating, the sealant can be filled in the cartridge when necessary.

In the mixing apparatus according to the present invention, it is preferable to provide a first mass flowmeter on the first channel, measure a mass flow rate of the first raw material passing through the first channel, and adjust, with a first decompressor, a decompression state in the first supply unit on the basis of a result of the measurement. Similarly, in the mixing apparatus according to the present invention, it is preferable to provide a second mass flowmeter on the second channel, measure a mass flow rate of the second raw material passing through the second channel, and adjust, with a second decompressor, a decompression state in the second supply unit on the basis of a result of the measurement.

To reduce the air caught in the process of mixing, it is preferable that the air contained in the first raw material and the second raw material is small in the first supply unit and the second supply unit that supply the materials. However, on the other hand, it is desired that the sealant obtained by mixing the main agent and the curing agent is held under minimum pressure in order to prevent an organic solvent in the sealant from being excessively vaporized to cause a composition change. Therefore, excessive decompression in the first and second supply units should be prevented. Therefore, the first mass flowmeter and the second mass flowmeter are respectively provided in the first channel and the second channel, mass flow rates of the first raw material and the second raw material passing the first channel and the second channel are measured, and, if it is detected that an amount of the air contained in the first raw material and the second raw material deviates from a desired range, decompression states in the first supply unit and the second supply unit are adjusted. This makes it possible to supply the first raw material and the second raw material containing appropriate amounts of the air to the mixer.

As the mixer according to the present invention, it is preferable to arrange a static mixer on an upstream side and arrange a dynamic mixer on a downstream side of the static mixer. The first raw material and the second raw material having high viscosity cannot be sufficiently uniformly mixed only by the static mixer. In the dynamic mixer, since a load on a driving source (a motor) for mixing the first raw material and the second raw material having high viscosity is large, as in the static mixer, the first raw material and the second raw material cannot be sufficiently mixed. On the other hand, a uniform mixed state can be obtained by causing the first raw material and the second raw material to pass the static mixer and the dynamic mixer in this order.

The mixing apparatus according to the present invention preferably include a first flow rate adjusting device that is provided on the first channel and supplies the first raw material, which is supplied from the first supply unit, to the third channel in a necessary amount and a second flow rate adjusting device that is provided on the second channel and supplies the second raw material, which is supplied from the second supply unit, to the third channel in a necessary amount.

For example, the necessary amounts of the first raw material and the second raw material can be intermittently supplied by controlling a rotation amount of a motor as in a screw pump or a gear pump. Therefore, even when the first raw material and the second raw material are continuously mixed, the mixing apparatus does not have to include an element for accumulating the sealant after the mixing. In other words, it is possible to obtain a mixed material in a necessary amount and at necessary timing by causing the necessary amount of the first raw material and the necessary amount of the second raw material to pass through the static mixer and the dynamic mixer. On the other hand, in the case of a displacement type such as a cylinder piston, when the first raw material and the second raw material are continuously mixed, since accumulation is necessary, contrivance for performing the mixing as continuous processing, for example, providing cylinder pistons in tandem is necessary.

For example, when a sealant frozen at temperature as low as −40° C. to −60° C. is used, it takes a long time to defrost the sealant to the room temperature.

In the present invention, since a sealant can be obtained at temperature equal to or higher than −40° C., a defrosting time can be reduced. This is important to improve work efficiency of workers who actually work. When the sealant obtained while mixing the first raw material and the second raw material is used for the sealing work, the mixing can also be performed at the room temperature. If timing requested in the sealing work is in a unit of several minutes, the sealant is cooled to temperature near zero degree. If timing requested in the work is in a unit of several tens minutes, the sealant only has to be cooled to temperature near −10 to −20° C. The temperature and time are different depending on a sealant. Therefore, a relation between temperature and a curing time should be grasped in each of sealants.

Advantageous Effects of Invention

The mixing apparatus according to the present invention includes the in-system decompressor that sets at least the mixer in a decompressed atmosphere before the first raw material and the second raw material are mixed. Since the first raw material and the second raw material can be mixed after the mixer is set in the decompressed atmosphere, it is possible to reduce the air caught in the process of mixing. Therefore, even if an obtained mixed material, for example, a sealant is jetted from the cartridge, a burst is not caused.

EMBODIMENTS TO CARRY OUT THE PRESENT INVENTION

An embodiment according to the present invention is explained below with reference to FIG. 1 and FIGS. 2A-2C.

Figure 1:
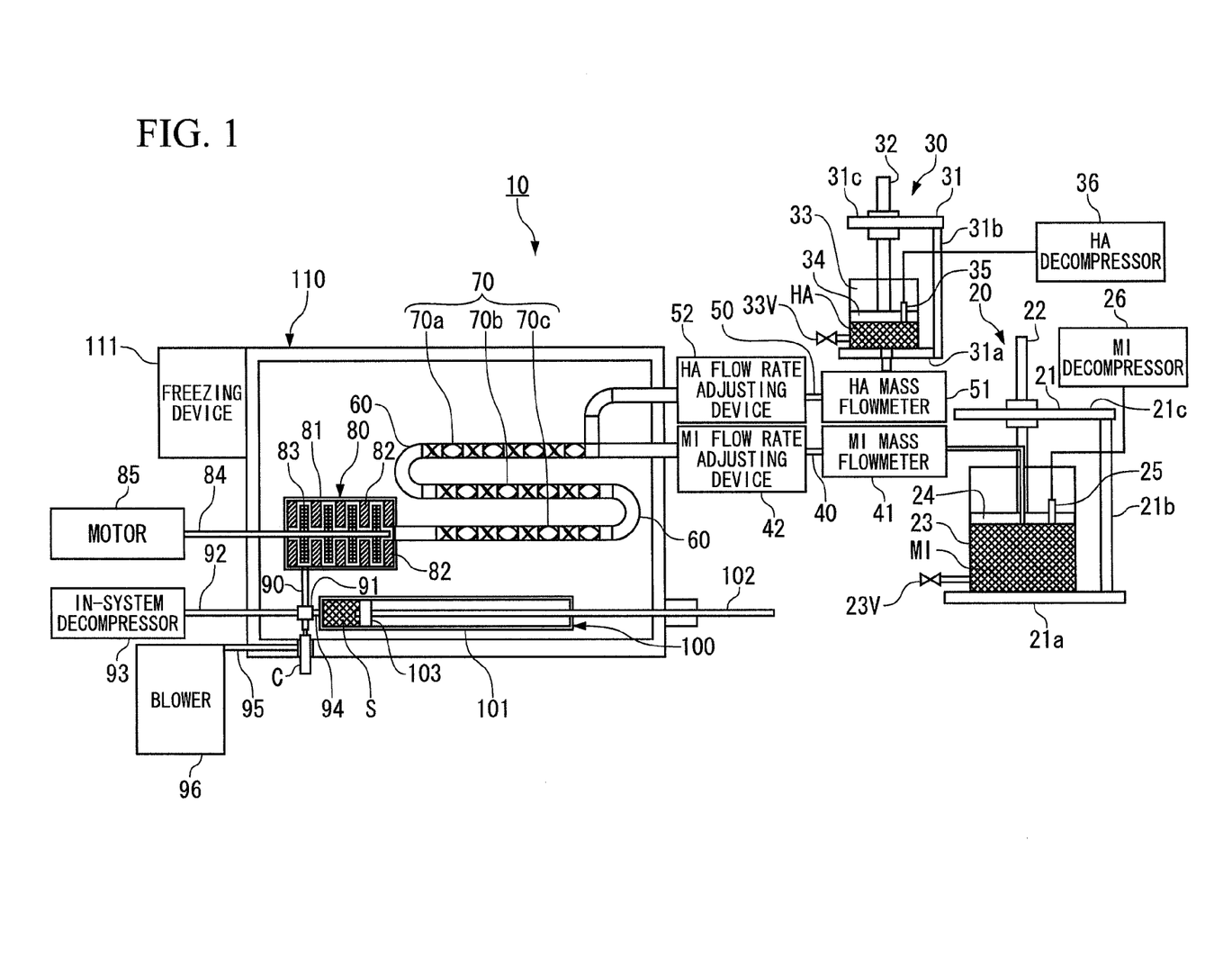
FIG. 1 is a diagram showing the configuration of a mixing apparatus according to an embodiment.

A mixing apparatus 10 according to this embodiment mixes a main agent MI and a curing agent HA in order to obtain a sealant.

Explaining an entire configuration, the mixing apparatus 10 includes a main agent supply unit (a first supply unit) 20 that supplies the main agent (a first raw material) MI to a main agent supply pipe (a first channel) 40 and a curing agent supply unit (a second supply unit) 30 that supplies the curing agent (a second raw material) HA to a curing agent supply pipe (a second channel) 50.

On the main agent supply pipe 40, one end of which communicates with the main agent supply unit 20, a main agent mass flowmeter 41 and a main agent flow rate adjusting device 42 are provided in order from the main agent supply unit 20. On the curing agent supply pipe 50, one end of which communicates with to the curing agent supply unit 30, a curing agent mass flowmeter 51 and a curing agent flow rate adjusting device 52 are provided in order from the curing agent supply unit 30.

The main agent MI supplied from the main agent supply unit 20 passes through the main agent supply pipe 40 and the curing agent HA supplied from the curing agent supply unit 30 passes through the curing agent supply pipe 50. The main agent MI and the curing agent HA flow into a mixing pipe 60 formed by merging of the main agent supply pipe 40 and the curing agent supply pipe 50. On the mixing pipe 60, a static mixer 70 and a dynamic mixer 80 are provided in order from the upstream side. A sealant obtained by mixing the main agent MI and the curing agent HA in order in the static mixer 70 and the dynamic mixer 80 is filled in a cartridge C via a discharge pipe 90 and a four-way valve 91.

After setting the insides of the static mixer 70 and the dynamic mixer 80 in a decompressed atmosphere with an in-system decompressor 93, the mixing apparatus 10 leads the main agent MI and the curing agent HA to the static mixer 70 and the dynamic mixer 80 and mixes the main agent MI and the curing agent HA. As the in-system decompressor 93, publicly-known means such as a vacuum pump can be used.

The mixing apparatus 10 includes a cylinder device (a storage container) 100 that temporarily stores a sealant S obtained by mixing the main agent MI and the curing agent HA. The cylinder device 100 receives and stores the sealant S via the discharge pipe 90 and the four-way valve 91. The cylinder device 100 discharges the stored sealant S and fills the sealant S in the cartridge C via the four-way valve 91 and the discharge pipe 90.

The mixing apparatus 10 includes a cooling box 110 that can cool the inside thereof to predetermined temperature equal to or lower than the room temperature with a freezing device 111. The static mixer 70, the dynamic mixer 80, and the cylinder device 100 are arranged in the cooling box 110. The sealant S passing through or stored in the static mixer 70, the dynamic mixer 80, and the cylinder device 100 can be cooled to predetermined temperature.

The main agent supply unit 20 includes a C-shaped frame 21. A main agent container 23 is mounted on a bottom plate 21a of this frame 21. The frame 21 includes the bottom plate 21a on which the main agent container 23 is mounted, a top plate 21c arranged a predetermined space apart from the bottom plate 21a, and a side plate 21b that connects the bottom plate 21a and the top plate 21c.

A predetermined amount of the main agent MI is filled in the main agent container 23. A pressing cap 24 is placed on the upper surface of the main agent MI in the main agent container 23. An elevating rod 22 supported on the top plate 21c to be capable of ascending and descending by a not-shown elevating mechanism is connected to the upper surface of the pressing cap 24.

An exhaust port 25 is provided in the pressing cap 24. The exhaust port 25 is connected to a main agent decompressor 26. When the main agent decompressor 26 is operated, an area surrounded by the main agent container 23 and the pressing cap 24 can be decompressed.

A main agent supply port 23V is provided at the bottom of the main agent container 23. The main agent MI stored in another container is delivered under pressure into the main agent container 23 via the main agent supply port 23V by, for example, a not-shown pump. The main agent MI is delivered under pressure into the main agent container 23 while being pressed by the pressing cap 24. While the main agent MI is delivered, a head space of the main agent container 23 is decompressed by the main agent decompressor 26 connected to the exhaust port 25. Since the main agent MI is a high viscosity fluid and has specific gravity equal to or higher than 1, the main agent Ml is filled in the main agent container 23 without being caught by the exhaust port 25 even by the decompression by the main agent decompressor 26.

A hole piercing from the front to the rear is formed in the center of the pressing cap 24. One end of the main agent supply pipe 40 is inserted into this through hole. One end side of the main agent supply pipe 40 is coaxially arranged on the inside of the elevating rod 22. When the pressing cap 24 is pressed downward, the main agent MI is supplied to the main agent supply pipe 40 through the through hole of the pressing cap 24.

The curing agent supply unit 30 has a configuration substantially the same as that of the main agent supply unit 20. A curing agent container 33 is mounted on a bottom plate 31*a* of a frame 31. The frame 31 includes the bottom plate 31*a* on which the curing agent container 33 is mounted, a top plate 31*c* arranged a predetermined space apart from the bottom plate 31*a*, and a side plate 31*b* that connects the bottom plate 31*a* and the top plate 31*c*. A hole piercing from the front to the rear is formed in the center of the bottom plate 31*a*. One end of the curing agent supply pipe 50 is inserted into this through hole.

A predetermined amount of the curing agent HA is filled in the curing agent container 33. A pressing cap 34 is placed on the upper surface of the curing agent HA in the curing agent container 33. An elevating rod 32 supported on the top plate 31*c* to be capable of ascending and descending by a not-shown elevating mechanism is connected to the upper surface of the pressing cap 34. A hole piercing from the front to the rear is formed in a bottom plate of the curing agent container 33 to correspond to the through hole of the bottom plate 31*a* of the frame 31. When the pressing cap 34 is pressed downward, the curing agent HA in the curing agent container 33 is supplied to the curing agent supply pipe 50 through these through holes.

An exhaust port 35 is provided in the pressing cap 34. The exhaust port 35 is connected to a curing agent decompressor 36. When the curing agent decompressor 36 is operated, an area surrounded by the curing agent container 33 and the pressing cap 34 can be set in a decompressed atmosphere.

Like the main agent MI, the curing agent HA is delivered under pressure into the curing agent container 33 via a curing agent supply port 33V.

The main agent mass flowmeter 41 is provided on a main agent supply pipe 40 connected to the main agent supply unit 20. The curing agent mass flowmeter 51 is provided on a curing agent supply pipe 50 connected to the curing agent supply unit 30.

The main agent mass flowmeter 41 measures a mass flow rate of the main agent MI passing through the main agent supply pipe 40. The curing agent mass flowmeter 51 measures a mass flow rate of the curing agent HA passing through the curing agent supply pipe 50. The mass flow rates of the main agent MI and the curing agent HA are measured to detect amounts of the air contained in the main agent MI and the curing agent HA. As explained above, predetermined amounts of the air need to be contained in the main agent MI and the curing agent HA. On the other hand, if the amounts of the air contained therein are too large, the sealant S causes a burst during the sealing work. Therefore, in order to control the amounts of the air respectively contained in the main agent MI and the curing agent HA, the main agent mass flowmeter 41 measures a mass flow rate of the main agent MI, and the curing agent mass flowmeter 51 measures a mass flow rate of the curing agent HA. When the measured mass flow rates are smaller than reference mass flow rates, it is determined that the amounts of the air contained in the main agent MI and the curing agent HA are large. Then, degrees of the decompression by the main agent decompressor 26 and the curing agent decompressor 36 are increased. Conversely, when the measured mass flow rates are larger than the reference mass flow rates, it is determined that the amounts of the air contained in the main agent MI and the curing agent HA are small. Then, the degrees of the decompression by the main agent decompressor 26 and the curing agent decompressor 36 are reduced.

As the main agent mass flowmeter 41 and the curing agent mass flowmeter 51, a publicly-known mass flowmeter such as a Coriolis mass flowmeter can be used.

The main agent flow rate adjusting device 42 is provided on the downstream side of the main agent mass flowmeter 41 on the main agent supply pipe 40. The curing agent flow rate adjusting device 52 is provided on the downstream side of the curing agent mass flowmeter 51 on the curing agent supply pipe 50. The main agent flow rate adjusting device 42 delivers a predetermined amount of the main agent MI to the downstream side of the main agent supply pipe 40 under pressure. The curing agent flow rate adjusting device 52 delivers a predetermined amount of the curing agent HA to the downstream side of the curing agent supply pipe 50 under pressure. As the main agent flow rate adjusting device 42 and the curing agent flow rate adjusting device 52, a publicly-known flow rate adjusting device such as a plunger pump, a gear pump, or a system for extruding the main agent MI and the curing agent HA to be mixed at a desired mixing ratio at a pressure receiving area ratio of two double-acting cylinders can be used.

It is also possible to mix the main agent MI and the curing agent HA by lowering the elevating rod 22 of the main agent supply unit 20 and the elevating rod 32 of the curing agent supply unit 30 stepwise by a fixed amount at fixed speed according to a mixing ratio and flow rates of the main agent MI and the curing agent HA.

The main agent supply pipe 40 and the curing agent supply pipe 50 merge with the mixing pipe 60 in the cooling box 110. Therefore, the main agent MI carried through the main agent supply pipe 40 and the curing agent HA carried through the curing agent supply pipe 50 are caused to flow into the mixing pipe 60. In the mixing pipe 60, the static mixer 70 and the dynamic mixer 80 are provided in order from the upstream side. The main agent MI and the curing agent HA flown into the mixing pipe 60 are mixed by the static mixer 70 and the dynamic mixer 80 in this order.

In the static mixer 70, elements such as fins and obstacles attached in a pipe form a channel formed in plural stages to facilitate the mixing. These components do not move. In the static mixer 70, the main agent MI and the curing agent HA as objects to be mixed are mixed while repeating division, rotation, turn, and the like in the respective stages in the mixer. As the static mixer 70, a mixer that can generate a turbulent flow for intensifying the mixing is preferable.

In the mixing apparatus 10, the static mixer 70 includes three sections, i.e., a first section 70*a*, a second section 70*b*, and a third section 70*c*. The first section 70*a* and the second section 70*b* are connected and the second section 70*b* and the third section 70*c* are connected by the mixing pipe 60 to improve efficiency of the mixing. However, it goes without saying that the present invention is not limited to this form.

The mixing of the main agent MI and the curing agent HA may be ended by only the static mixer 70. However, in order to obtain a more uniform mixed state, in the mixing apparatus 10, the dynamic mixer 80 is provided on the downstream side of the static mixer 70. A mixture (the sealant S) of the main agent MI and the curing agent HA supplied from the mixing pipe 60 is mixed in the dynamic mixer 80. The dynamic mixer 80 applies shearing force stronger than that of the static mixer 70 to the mixture to improve a mixed state of a portion insufficiently mixed by the static mixer 70.

As the dynamic mixer 80, there are various forms. For example, plural (in this example, five) ring-like channel forming members 82 are set in a cylindrical mixing container 81 in an axial direction spaced apart from one another. Rotary blades 83 are arranged in the spaces. The rotary blades 83 are fixed to a shaft 84 driven to rotate by a motor 85. Holes piercing through the rotary blades 83 in the thickness direction are provided in the rotary blades 83. In this dynamic mixer 80, when the motor 85 is driven to rotate, the sealant S passes through the holes formed in the rotary blades 83 while being subjected to the shearing force between the channel forming member 82 and the rotating rotary blades 83. The sealant S is carried to stages of the rotary blades 83 on the downstream side. The sealant S in which the main agent MI and the curing agent HA are set in a uniform mixed state according to repletion of this operation is delivered to the discharge pipe 90.

The four-way valve 91 is provided on the discharge pipe 90. A decompression pipe 92 and a bypass pipe 94 are connected to the four-way valve 91 (see FIGS. 2A-2C as well). By switching the four-way valve 91, it is possible to select four channels, i.e., a first channel through which the sealant S flowing through the discharge pipe 90 flows to the cartridge C, a second channel to which the discharge pipe 90 and the decompression pipe 92 are connected, a third channel to which the discharge pipe 90 and the bypass pipe 94 are connected, and a fourth channel through which the sealant S flows from the bypass pipe 94 to the cartridge C.

The in-system decompressor 93 is connected to an end of the decompression pipe 92. When the in-system decompressor 93 is actuated in a state in which the four-way valve 91 selects the second channel, it is possible to keep the inside of the system, which includes the devices and the pipes located further on the upstream side than the four-way valve 91, in a decompressed state.

Before starting the mixing work for the main agent MI and the curing agent HA, the mixing apparatus 10 selects the second channel and keeps the inside of the system in the decompression state. Consequently, the mixing apparatus 10 eliminates the air, in particular, in the static mixer 70 and the dynamic mixer 80 and reduces the air caught during the mixing.

The cylinder device 100 is connected to the bypass pipe 94. The cylinder device 100 temporarily stores the sealant S passed through the dynamic mixer 80 and discharges the sealant S when necessary, i.e., when the sealant S is filled in the cartridge C. The cylinder device 100 includes a cylinder 101 and a piston 103 arranged to be capable of reciprocatingly moving in the axial direction in the cylinder 101 according to the operation of a piston rod 102. The piston rod 102 is driven by a not-shown driving source.

When the mixing apparatus 10 performs mixing of the main agent MI and the curing agent HA but it is unnecessary to fill the sealant S in the cartridge C, the four-way valve 91 selects the third channel. Then, the sealant S passed through the dynamic mixer 80 flows through the discharge pipe 90, the four-way valve 91, and the bypass pipe 94 in this order. At this point, the piston rod 102 is retracted such that the sealant S flowing into the bypass pipe 94 can be received in the cylinder 101. In this way, the sealant S is temporarily stored in the cylinder device 100.

When the sealant S is discharged from the cylinder device 100 and filled in the cartridge C, the four-way valve 91 selects the fourth channel. Then, even when the mixing apparatus 10 is not mixing the main agent MI and the curing agent HA in the static mixer 70 and the dynamic mixer 80, the sealant S can be filled in the cartridge C.

The inside of the cooling box 110 can be kept at arbitrary temperature equal to or lower than the room temperature, for example, around −29° C. by the freezing device 111.

The static mixer 70, the dynamic mixer 80, and the cylinder device 100 are housed in the cooling box 110. When the sealant S is obtained by mixing the main agent MI and the curing agent HA, the curing of the sealant S proceeds. When the mixing work is temporarily stopped, the sealant in the static mixer 70 and in the dynamic mixer 80 start to cure. After the operation is resumed, the cured sealant has to be removed. However, if the inside of the cooling box 110 is maintained at temperature around −29° C., it is possible to suppress the curing reaction and, even if the mixing is temporarily stopped, immediately resume the mixing.

Therefore, when the sealant S passed through the static mixer 70 and the dynamic mixer 80 is directly filled in the cartridge C, the sealant S, the curing of which has hardly proceeded, can be supplied to the cartridge C. When the sealant S stored in the cylinder device 100 is filled in the cartridge C, the sealant S, the curing of which has hardly proceeded, can also be supplied to the cartridge C. As the curing less proceeds, the sealing work is easier.

As the freezing device 111, a publicly-known freezing cycle including a compressor, a condenser, an expansion valve, and an evaporator as basic components can be used.

Figure 2A:
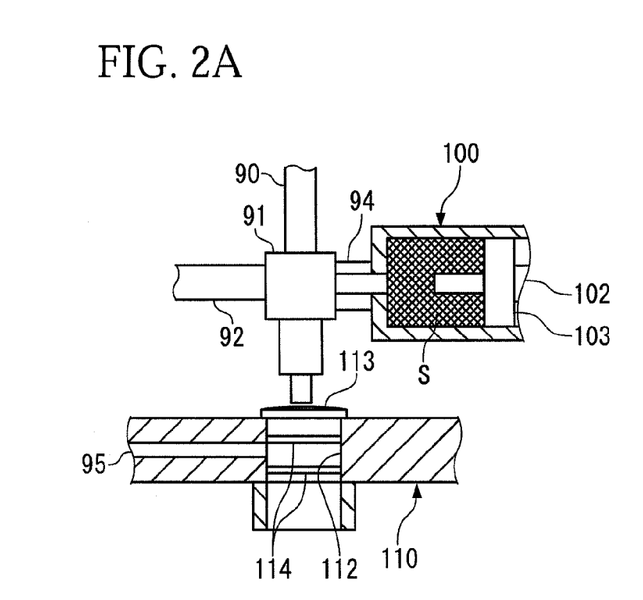
FIGs. 2A-2C are partially enlarged sectional views of the mixing apparatus shown in FIG. 1.
Figure 2B:
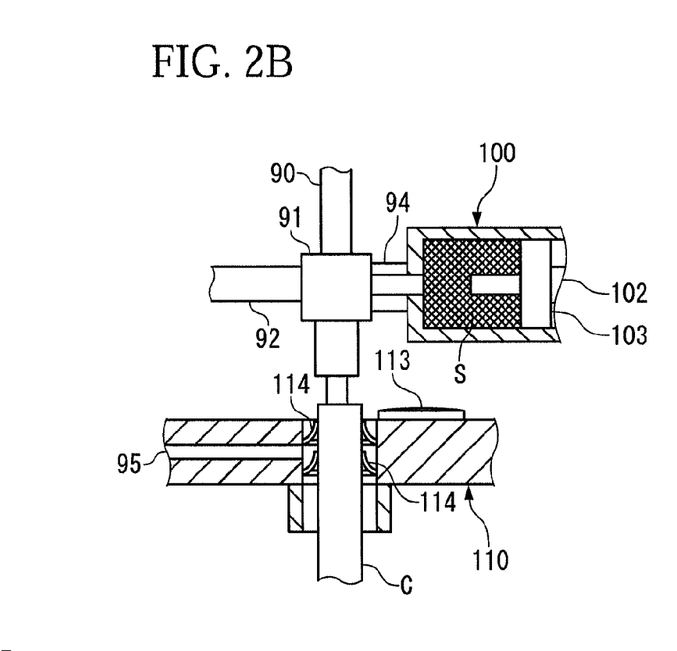

A cartridge insertion hole 112 is provided in a position corresponding to the distal end of the discharge pipe 90 below the cooling box 110. When the sealant S is filled in the cartridge C, the cartridge C is inserted into the cartridge insertion hole 112. A slide valve 113 is provided in an opening on the cooling box 110 side of the cartridge insertion hole 112. The slide valve 113 closes the opening when the sealant S is not filled (FIG. 2A). The slide valve 113 opens the opening when the sealant S is filled (FIG. 2B). In the cartridge insertion hole 112, valves 114 made of a flexible material such as rubber are provided in two stages spaced apart from each other. In the valves 114, slits 115 are radially provided. The inserted cartridge C can be allowed to pass through the valves 114.

In the mixing apparatus 10, in order to prevent frosting near the cartridge insertion hole 112, the dry air sent from a blower 96 is supplied to the cartridge insertion hole 112 via an air feed pipe 95.

A procedure for mixing the main agent MI and the curing agent HA to obtain the sealant S using the mixing apparatus 10 explained above is explained.

First, the main agent decompressor 26 and the curing agent decompressor 36 are operated, whereby decompression processing is applied to the main agent MI stored in the main agent supply unit 20 and the curing agent HA stored in the curing agent supply unit 30.

The in-system decompressor 93 is operated, whereby the inside of the system including the static mixer 70 and the dynamic mixer 80 is set in the decompressed atmosphere. At this point, the four-way valve 91 selects the second channel to which the discharge pipe 90 and the decompression pipe 92 are connected. It is possible to experimentally calculate, according to types of the main agent MI and the curing agent HA in use, as well as the performance of the static mixer 70 and the dynamic mixer 80, to which degree of the decompressed atmosphere the inside of the system is set. The decompression processing by the main agent decompressor 26, the curing agent decompressor 36, and the in-system decompressor 93 can be appropriately performed not only in the beginning but also while mixing is performed.

The inside of the cooling box 110 can be maintained at temperature around, for example, −29° C. by operating the freezing device 111. By operating the blower 96, the dry air is supplied to the cartridge insertion hole 112 to prevent a large amount of frost from depositing.

After the preparation explained above is done, the elevating rod 22 of the main agent supply unit 20 is lowered to supply the main agent MI to the main agent mass flowmeter 41. The elevating rod 32 of the curing agent supply unit 30 is lowered to supply the curing agent HA to the curing agent mass flowmeter 51.

The main agent mass flowmeter 41 and the curing agent mass flowmeter 51 respectively measure mass flow rates of the main agent MI and the curing agent HA continuously supplied. According to a measurement result, degrees of decompression by the main agent decompressor 26 and the curing agent decompressor 36 are adjusted.

The main agent MI passed through the main agent mass flowmeter 41 and the curing agent HA passed through the curing agent mass flowmeter 51 are carried to the mixing pipe 60 respectively by the main agent flow rate adjusting device 42 and the curing agent flow rate adjusting device 52 by desired amounts.

The main agent MI and the curing agent HA carried to the mixing pipe 60 are mixed in a process of passing through the static mixer 70 (70a to 70c). The mixed main agent MI and curing agent HA (the sealant S) are further mixed by the dynamic mixer 80. A form of the mixing by the static mixer 70 and the dynamic mixer 80 is as explained above.

Since the static mixer 70 and the dynamic mixer 80 are set in the decompressed atmosphere in advance, the air is not caught by the mixing or, even if the air is caught by the mixing, the air caught by the mixing can be minimized.

The sealant S mixed by the dynamic mixer 80 is delivered to the discharge pipe 90. The sealant S finished being mixed is processed as explained below.

When the sealant S is filled in the cartridge C, the four-way valve 91 selects the first channel. The sealant S flowing through the discharge pipe 90 is filled in the cartridge C through the four-way valve 91.

When the sealant S is temporarily stored in the cylinder device 100 without being filled in the cartridge C, the four-way valve 91 selects the third channel. The sealant S is received in the cylinder device 100 through the discharge pipe 90, the four-way valve 91, and the bypass pipe 94 in this order. When the sealant S stored in the cylinder device 100 is filled in the cartridge C, the four-way valve 91 selects the fourth channel. The sealant S is filled in the cartridge C through the bypass pipe 94, the four-way valve 91, and the discharge pipe 90 in this order.

With the mixing apparatus 10 explained above, effects explained below are realized.

The mixing apparatus 10 sets, using the in-system decompressor 93, the inside of the system including the static mixer 70 and the dynamic mixer 80 in the decompressed atmosphere in advance before starting mixing. Therefore, it is possible to reduce an amount of the air caught in the obtained sealant S. In the mixing apparatus 10, the processing for setting the inside of the system in the decompressed atmosphere is performed via the four-way valve 91 provided further downstream than the dynamic mixer 80. Therefore, it is also possible to reduce the air caught in the sealant S after passing through the dynamic mixer 80. As a result, it is possible to prevent the sealant S from bursting during the sealing work.

The mixing apparatus 10 performs, in the cooling box 110, the process after the main agent MI and the curing agent HA are mixed. Therefore, the inside of the cooling box 110 is maintained at temperature lower than curing temperature of the sealant S. Consequently, in cases including a case in which the sealant S is temporarily stored in the cylinder device 100, it is possible to supply the sealant S, the curing of which has hardly proceeded, to the cartridge C.

Figure 2C:
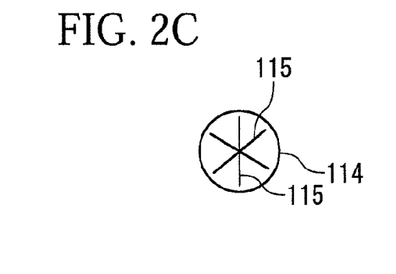

When the mixing apparatus 10 is cooled, the vicinity of the discharge port of the discharge pipe 90 for the sealant is cooled and thereby moisture contained in the ambient air condenses and deposits. If the temperature in the cooling box 110 falls to be equal to or lower than zero degree, frost is formed. Therefore, valves for shielding the discharge port from the outdoor air, specifically, the valves 114 are provided in two stages. The valves 114 are provided in two stages and the dry air is supplied to the space between the valves 114. This makes it possible to prevent generation of a large volume of due condensation water and frosting.

Since the mixing apparatus 10 temporarily stores the sealant S in the cylinder device 100 and, moreover, the cylinder device 100 is set on the inside of the cooling box 110, it is possible to supply the sealant S, the curing of which has hardly proceeded, when a worker needs the sealant S. Therefore, with the mixing apparatus 10, the sealing work is not delayed because of shortage of the sealant S.

The mixing apparatus 10 includes the main agent mass flowmeter 41 and the main agent decompressor 26 corresponding to the main agent mass flowmeter 41 and includes the curing agent mass flowmeter 51 and the curing agent decompressor 36 corresponding to the curing agent mass flowmeter 51. The mixing apparatus 10 can operate, on the basis of a mass flow rate of the main agent MI measured by the main agent mass flowmeter 41 and a mass flow rate of the curing agent HA measured by the curing agent mass flowmeter 51, the main agent decompressor 26 and the curing agent decompressor 36 and optimize amounts of the air contained in the main agent MI and the curing agent HA supplied to the static mixer 70. Therefore, the mixing apparatus 10 can prevent the air from being caught while securing an optimum amount of the air required in the function of the sealant S.

The mixing apparatus 10 mixes the main agent MI and the curing agent HA with the static mixer 70 and the dynamic mixer 80 in this order to thereby realize a uniform mixed state even if the main agent MI and the curing agent HA have high viscosity.

If a main agent and a curing agent can be extruded according to a mixing ratio using a mechanism for extruding fixed amounts of the main agent and the curing agent such as a combination of a motor and a ball screw as the main agent flow rate adjusting device 42 and the curing agent flow rate adjusting device 52 of the mixing apparatus 10, even if a cylinder mechanism does not include an accumulating element, a curing reaction in the static mixer 70 and the dynamic mixer 80 can be suppressed by cooling. Therefore, it is possible to obtain a necessary amount of a sealant when necessary.

The present invention is explained above concerning the example in which the main agent MI and the curing agent HA are mixed. However, a target of mixing is not limited to the sealant S. The present invention can be widely applied when two or more kinds of materials having high viscosity exceeding, for example, 10 Pa·s (100 Poise) such as adhesives are uniformly mixed.

REFERENCE SIGNS LIST

10 . . . mixing apparatus, 20 . . . main agent supply unit (first supply unit), 23 . . . main agent container, 26 . . . main agent decompressor, 30 . . . curing agent supply unit (second supply unit), 33 . . . curing agent container, 36 . . . curing agent decompressor, 40 . . . main agent supply pipe (first channel), 41 . . . main agent mass flowmeter (first mass flowmeter), 50 . . . curing agent supply pipe (second channel), 51 . . . curing agent mass flowmeter (second mass flowmeter), 60 . . . mixing pipe (third channel), 70 . . . static mixer, 80 . . . dynamic mixer, 90 . . . discharge pipe (fourth channel), 93 . . . in-system decompressor, 100 . . . cylinder device, 110 . . . cooling box, C . . . cartridge, HA . . . curing agent, MI . . . main agent, S . . . sealant

The invention claimed is:

1. A mixing apparatus for a high viscosity material comprising:
    a first supply unit that supplies a first raw material to a first channel;
    a second supply unit that supplies a second raw material to a second channel;
    a first decompressor that is connected to the first supply unit;
    a second decompressor that is connected to the second supply unit;
    a third channel with which the first channel and the second channel merge and through which the first raw material and the second raw material pass;
    a mixer that includes a static mixer and a dynamic mixer, and is provided on the third channel and mixes the first raw material and the second raw material;
    a fourth channel through which a mixed material obtained through the mixer is discharged; and
    an in-system decompressor that sets at least the static mixer and the dynamic mixer in a decompressed atmosphere,
    wherein the first and second supply units supply the first and second raw materials to the first and second channels, respectively, after the in-system decompressor sets at least the static mixer and the dynamic mixer in the decompressed atmosphere, and
    wherein the first decompressor decompresses the first supply unit containing the first raw material to a pressure that is lower than an outside pressure, and the second decompressor decompresses the second supply unit containing the second raw material to a pressure that is lower than the outside pressure.

2. The mixing apparatus for a high viscosity material according to claim 1, further comprising a cooling box that houses the mixer and cools the mixer at least while the mixer mixes the first raw material and the second raw material.

3. The mixing apparatus for a high viscosity material according to claim 2, further comprising:
    an air blowing means for blowing dry air to a discharge port through which the mixed material is discharged from the cooling box; and
    valves that block the discharge port from an outside of the cooling box.

4. The mixing apparatus for a high viscosity material according to claim 2, further comprising a mixed material storage container that is provided in the cooling box and in which the mixed material passing through the fourth channel flows and is temporarily stored.

5. The mixing apparatus for a high viscosity material according to claim 1, further comprising:
    a first mass flowmeter that is provided on the first channel and measures a mass flow rate of the first raw material passing through the first channel;
    a second mass flowmeter provided on the second channel and measures a mass flow rate of the second raw material passing through the second channel;
    a first decompressor that adjusts a decompression state in the first supply unit on the basis of a measurement result of the first mass flowmeter; and
    a second decompressor that adjusts a decompression state in the second supply unit on the basis of a measurement result of the second mass flowmeter.

6. The mixing apparatus for a high viscosity material according to claim 1, wherein the mixer includes a static mixer arranged on an upstream side and a dynamic mixer arranged on a downstream side of the static mixer.

7. The mixing apparatus for a high viscosity material according to claim 1, further comprising:
    a first flow rate adjusting device that is provided on the first channel and supplies the first raw material, which is supplied from the first supply unit, to the third channel in a necessary amount; and
    a second flow rate adjusting device that is provided on the second channel and supplies the second raw material, which is supplied from the second supply unit, to the third channel in a necessary amount.

8. A mixing apparatus for a high viscosity material comprising:
    a first supply unit that supplies a first raw material to a first channel;
    a second supply unit that supplies a second raw material to a second channel;
    a third channel with which the first channel and the second channel merge and through which the first raw material and the second raw material pass;
    a mixer that is provided on the third channel and mixes the first raw material and the second raw material;
    a fourth channel through which a mixed material obtained through the mixer is discharged;
    an in-system decompressor that sets at least the mixer in a decompressed atmosphere before the first raw material and the second raw material are mixed;
    a cooling box that houses the mixer and cools the mixer at least while the mixer mixes the first raw material and the second raw material;
    an air blowing means for blowing dry air to a discharge port through which the mixed material is discharged from the cooling box; and
    valves that block the discharge port from an outside of the cooling box,
    wherein the valves are provided in two stages spaced apart from each other, and the dry air is supplied to a space between the valves provided in the two stages.

9. The mixing apparatus for a high viscosity material according to claim 1, further comprising a four-way valve connected between the fourth channel and the in-system decompressor,
    wherein the fourth channel is located upstream of the in-system decompressor,
    wherein the in-system decompressor is connected to the four-way valve via a decompression pipe, and
    wherein the in-system decompressor sets at least the static mixer and the dynamic mixer in the decompressed atmosphere when the four-way valve selects a channel that connects the fourth channel to the decompression pipe.

10. The mixing apparatus for a high viscosity material according to claim 9, wherein the fourth channel is located upstream of the four-way valve and is decompressed when the four-way valve selects the channel that connects the fourth channel to the decompression pipe.

\* \* \* \* \*